Sept. 20, 1960   L. A. RUNTON ET AL   2,953,418
MOLDED RESIN BEARINGS
Filed May 1, 1958
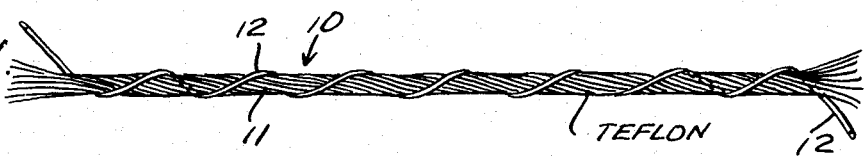
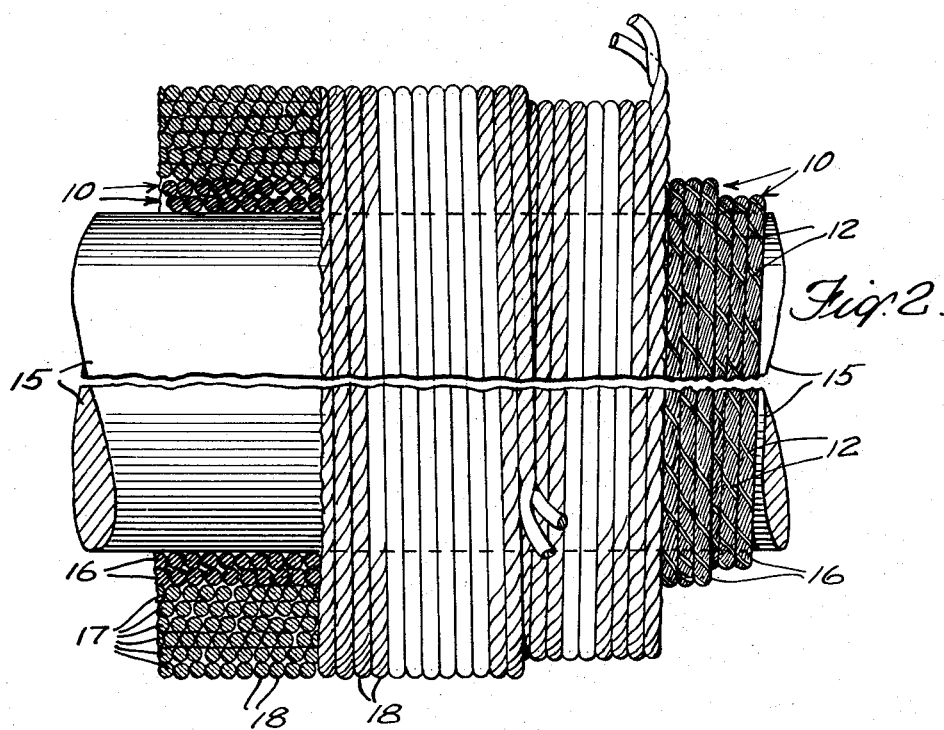
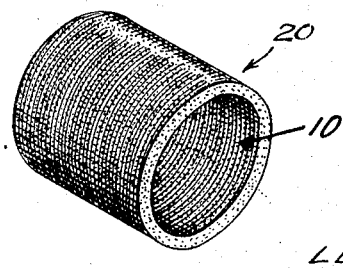
INVENTORS
LESLIE A. RUNTON
HENRY C. MORTON
BY
ATTORNEY

United States Patent Office 2,953,418
Patented Sept. 20, 1960

2,953,418
MOLDED RESIN BEARINGS

Leslie A. Runton, Middle Haddam, and Henry C. Morton, Branford, Conn., assignors to The Russell Manufacturing Company, Middletown, Conn., a corporation Filed May 1, 1958, Ser. No. 732,272

10 Claims. (Cl. 308—238)

This invention relates to low friction, molded resin bearings and more particularly to a method of fabricating such bearings.

An object is to provide a molded resin bearing having novel and improved characteristics.

Another object is to provide a novel and improved method of forming such a bearing.

Other objects and advantages will be apparent as the nature of the invention is more fully disclosed.

In accordance with the present invention, the bearing consists of a resin impregnated yarn composed of tetrafluoroethylene (Teflon) twisted or wrapped with a heat-shrinkable and resin-bondable yarn such as nylon or Dacron, wound in helical layers and cured to set the resin into a hard rigid structure. The layers of Teflon yarn may be backed by one or more layers of such heat-shrinkable, bondable yarn, which is also impregnated with a thermosetting resin and which shrinks during the heat curing step so as to apply the necessary molding pressure to the resin. In the final product the layers of yarn are bound by the resin into a unitary structure with the Teflon yarn forming the inner bearing surface.

The nature of this invention will be better understood from the following description, taken in connection with the drawing forming a part thereof in which a specific embodiment has been set forth for purposes of illustration.

In the drawing:

Fig. 1 is a detail of the yarn which is adapted to form the bearing surface;

Fig. 2 is a broken elevation illustrating the method of winding the treated yarn for forming the molded bearing; and Fig. 3 is a perspective view of the finished bearing.

Referring to the drawing more in detail, the yarn 10 of Fig. 1 is composed of a core 11 of multi-filament tetrafluoroethylene (Teflon) yarn and a helical wrapping of a filament 12 which is capable of bonding to a resin impregnant and is heat-shrinkable, such as nylon or Dacron.

The yarn 10 is impregnated with a thermosetting bonding resin such as a phenolic resin or an epoxy resin or a melamine resin.

The bonding resin may be a phenolic resin derived from the reaction of phenol, cresol or a homologue with formaldehyde under controlled conditions or may comprise an epoxy resin. In the drying step the mixture is heated to remove the solvent and the resin content polymerizes until a residual volatile content of 5% to 7% is attained.

For making the bearing, the impregnated and dried yarn 10 is wound on a mandril 15 under substantial tension in a pair of crossed helical layers 16 of opposite pitch to form a compact inner bearing surface composed entirely of the yarn 10 and of the cured impregnant.

The layers 16 are backed by a plurality of layers 17 of a heat-shrinkable and resin bondable yarn 18 such as continuous filament nylon or Dacron. The yarn 18 is also impregnated and dried with the same thermosetting resin as the yarn 10 above, and is wound over the layers 16 under substantial tension so as to make a compact winding and also to squeeze the impregnant into all pores and voids.

The mandril 15 and windings 16 and 17 thereon are then placed in a curing oven and subjected to a temperature of 300° F. to 350° F. for a period of from 30 to 60 minutes for curing the resin impregnant.

During this heat curing the nylon or Dacron yarns shrink strongly and thus apply a high pressure to the yarns 10 of the inner layers 16. This pressure serves to compact the resin so that the final product has the characteristics of a resin set under heat and pressure to a rigid, sustaining form.

The resin forms a tube 20 with the Teflon yarns 10 exposed on the inside to constitute the bearing surface.

The heat-set resin serves to bond the yarns of the various layers and of the various convolutions into a rigid unit. Although the Teflon 11 does not itself bond to the resin it is mechanically held in place by the wrapping 12 which is capable of so bonding and is held under tensions due to its heat-shrinkage.

This type of bearing may be made in extremely small sizes anr is more economical than woven fabric bearings of equivalent size, due to the low friction characteristics of the Teflon the bearing requires no lubrication and hence may be used in sealed instruments or in other inaccessible places.

Although a specific embodiment of the invention has been set forth for purposes of illustration it is to be understood that the invention may be applied to various uses and embodied in various forms as will be apparent to a person skilled in the art.

What is claimed is:

1. The method of making a molded resin bearing which comprises impregnating with a thermosetting resin a yarn composed of multifilament tetrafluoroethylene yarns with a wrapping composed of a resin bondable heat-shrinkable material, winding said yarn in the dried but uncured state on a core in the form of a compact helix, winding over said first yarn a resin impregnated yarn composed of a heat-shrinkable material, subjecting the windings while on said core to a temperature to cure the resin, whereby the heat-shrinkable yarns shrink and exert a pressure on the first yarn and on the bonding resin to form a product wherein the yarn convolutions are bonded by the heat-set resin into a unitary structure.

2. The method set forth in claim 1 in which the resin is a phenolic resin.

3. The method set forth in claim 1 in which the resin is an epoxy resin.

4. The method set forth in claim 1 in which the heat-shrinkable yarn is nylon.

5. The method set forth in claim 1 in which the heat-shrinkable yarn is Dacron.

6. A molded resin bearing comprising a plurality of layers of helically wound yarn, at least the inner layer comprising multifilament tetrafluoroethylene having a wrapping composed of a heat-shrinkable yarn, the outer layers being composed of a heat-shrinkable yarn, and a thermosetting resin in a state characteristic of a resin set and cured under high temperature and pressure, said resin bonding said heat-shrinkable yarns into a winding wherein the tetrafluoroethylene yarns are exposed to form the inner surface and are bound by said wrapping of heat-shrinkable yarn.

7. A bearing as set forth in claim 6 in which the resin is a phenolic resin.

8. A bearing as set forth in claim 6 in which the resin is an epoxy resin.

9. A bearing as set forth in claim 6 in which the heat-shrinkable yarn is composed of nylon.

10. A bearing as set forth in claim 6 in which the heat-shrinkable yarn is composed of Dacron.

References Cited in the file of this patent

UNITED STATES PATENTS

| | | |
|---|---|---|
| 166,885 | Murfey | Aug. 17, 1875 |
| 1,808,247 | Morris | June 2, 1931 |
| 2,128,087 | Gotke | Aug. 23, 1938 |
| 2,213,290 | Rowe | Sept. 3, 1940 |
| 2,322,771 | Palm | June 29, 1943 |
| 2,783,173 | Walker | Feb. 26, 1957 |
| 2,792,324 | Daley | May 14, 1957 |
| 2,804,886 | White | Sept. 3, 1957 |
| 2,836,744 | Clawson | May 27, 1958 |